(12) United States Patent
Takamatsu (10) Patent No.: US 9,237,567 B2
(45) Date of Patent: Jan. 12, 2016

(54) RADIO BASE STATION AND COMMUNICATION CONTROL METHOD INCLUDING RESOURCE ASSIGNMENT FOR DOWNLINK REPEAT DATA

(75) Inventor: Nobuaki Takamatsu, Adachi-ku (JP)

(73) Assignee: KYOCERA Corporation, Kyoto (JP)

( * ) Notice: Subject to any disclaimer, the term of this patent is extended or adjusted under 35 U.S.C. 154(b) by 26 days.

(21) Appl. No.: 14/235,064

(22) PCT Filed: Jul. 25, 2012

(86) PCT No.: PCT/JP2012/068811
§ 371 (c)(1),
(2), (4) Date: Jan. 26, 2014

(87) PCT Pub. No.: WO2013/015308
PCT Pub. Date: Jan. 31, 2013

(65) Prior Publication Data
US 2014/0169318 A1 Jun. 19, 2014

(30) Foreign Application Priority Data

Jul. 26, 2011 (JP) .................................. 2011-163734

(51) Int. Cl.
*H04L 12/28* (2006.01)
*H04W 72/04* (2009.01)
*H04L 5/00* (2006.01)
*H04L 5/14* (2006.01)
(Continued)

(52) U.S. Cl.
CPC ............... *H04W 72/042* (2013.01); *H04L 5/00* (2013.01); *H04L 5/0051* (2013.01); *H04L 5/1469* (2013.01); *H04W 72/0413* (2013.01); *H04L 1/1812* (2013.01); *H04L 5/0044* (2013.01)

(58) Field of Classification Search
CPC ....... H04L 5/001; H04L 5/0055; H04W 72/10
USPC .................................. 370/252, 278, 329, 430
See application file for complete search history.

(56) References Cited

U.S. PATENT DOCUMENTS

2002/0115467 A1* 8/2002 Hamabe .................... 455/522
2003/0086366 A1* 5/2003 Branlund et al. ........... 370/208
(Continued)

FOREIGN PATENT DOCUMENTS

| JP | 2011-119844 A | 6/2011 |
| JP | 2011-130438 A | 6/2011 |
| JP | 2012-182660 A | 9/2012 |

OTHER PUBLICATIONS

International Search Report; PCT/JP2012/068811; Oct. 23, 2012.
(Continued)

*Primary Examiner* — John Pezzlo
(74) *Attorney, Agent, or Firm* — Studebaker & Brackett PC (57) ABSTRACT

An eNB assigns an uplink SRS resource for transmitting the SRS utilized in an adaptive array control, and a PDSCH resource that overlaps, on a frequency axis, with the uplink SRS resource, to a UE. The eNB assigns the uplink SRS resource within a range of an SRS transmission available frequency band f1 that can be used for transmitting the SRS. When it is necessary to transmit downlink repeat data to a first UE when an assignment of the uplink SRS resource is switched from the first UE to a second UE, the eNB assigns the PDSCH resource for the downlink repeat data in an SRS transmission unavailable frequency band f2 outside the range of the SRS transmission available frequency band f1.

5 Claims, 6 Drawing Sheets

(51) Int. Cl.
    *H04J 1/16*     (2006.01)
    *H04L 1/18*     (2006.01)

(56) References Cited

U.S. PATENT DOCUMENTS

| | | | |
|---|---|---|---|
| 2006/0281494 A1* | 12/2006 | Wilson et al. | 455/562.1 |
| 2008/0253326 A1* | 10/2008 | Damnjanovic | 370/329 |
| 2009/0296649 A1* | 12/2009 | Yagi | 370/329 |
| 2010/0202420 A1* | 8/2010 | Jersenius et al. | 370/337 |
| 2010/0251054 A1* | 9/2010 | Cai et al. | 714/748 |
| 2010/0278121 A1* | 11/2010 | Chun et al. | 370/329 |
| 2010/0291959 A1* | 11/2010 | Inaida | 455/513 |
| 2010/0317363 A1* | 12/2010 | Bai et al. | 455/452.2 |
| 2010/0322171 A1* | 12/2010 | Dekorsy et al. | 370/329 |
| 2014/0321400 A1* | 10/2014 | Seo | H04W 52/146 370/329 |

OTHER PUBLICATIONS

3GPP TS 36.211 V8.7.0 (May 2009), 3rd Generation Partnership Project; Technical Specification Group Radio Access Network; Evolved Universal Terrestrial Radio Access (E-UTRA); Physical Channels and Modulation (Release 8).

3GPP TS 36.211 V9.1.0 (Mar. 2010), 3rd Generation Partnership Project; Technical Specification Group Radio Access Network; Evolved Universal Terrestrial Radio Access (E-UTRA); Physical Channels and Modulation (Release 9).

\* cited by examiner

RADIO BASE STATION AND COMMUNICATION CONTROL METHOD INCLUDING RESOURCE ASSIGNMENT FOR DOWNLINK REPEAT DATA

TECHNICAL FIELD

The present invention relates to a radio base station and a communication control method that perform radio communication by using adaptive array control and an automatic repeat request in a TDD radio communication system.

BACKGROUND ART

In a radio communication system (LTE system) that complies with LTE (Long Term Evolution) with its standards currently being discussed in 3GPP (Third Generation Partnership Project), a radio base station assigns a radio resource in radio communication between the radio base station and a radio terminal (for example, see Non Patent Literature 1).

Further, in an LTE system according to a Time Division Duplex (TDD) scheme (hereinafter, referred to as "TD-LTE system"), in order to increase a frequency utilization efficiency and improve quality of radio communication, it is considered that adaptive array control using an array antenna is introduced to the radio base station.

The adaptive array control includes a beamforming in which the peak of a directivity pattern of the array antenna is oriented to a radio terminal subordinate to the radio base station and a null steering in which the null of the directivity pattern of the array antenna is oriented to a radio terminal subordinate to another radio base station.

Further, in the LTE system, in order to ensure the reliability of the radio communication, Hybrid Automatic Repeat reQuest (HARQ), which is one of the automatic repeat requests, is introduced.

CITATION LIST

Non Patent Literature

Non Patent Literature 1: 3GPP TS 36.211 V8.7.0 "Physical Channels and Modulation", MAY 2009

SUMMARY OF THE INVENTION

In the TD-LTE system, it is supposed to realize the adaptive array control according to the following procedure.

The radio base station assigns an uplink reference signal resource for transmitting an uplink reference signal and a downlink radio resource that overlaps, on a frequency axis, with the uplink reference signal resource, to the radio terminal. Then, on the basis of the uplink reference signal received from the radio terminal, an antenna weight is calculated so that the peak of a directivity pattern is oriented to the radio terminal, whereby the beamforming is performed.

On the other hand, another radio base station performs a null steering by calculating, on the basis of the uplink reference signal received from the radio terminal, an antenna weight so that the null of a directivity pattern is oriented to the radio terminal.

In this way, the uplink reference signal resource and the downlink radio resource are assigned symmetrically for each radio terminal, and therefore, the adaptive array control in the TD-LTE system is realized.

However, when the number of radio terminals to be connected to the radio base station increases, it becomes necessary to change the assignment of the radio resource in order to ensure equality among the radio terminals. For example, it becomes necessary to assign the uplink reference signal resource having been assigned to the radio terminal (first radio terminal) to another radio terminal (second radio terminal) instead of the first radio terminal.

In this case, when it becomes necessary to repeat the HARQ destined to the first radio terminal when the assignment of the uplink reference signal resource is changed, the following problem occurs.

Specifically, when the transmission of repeat data is delayed, a repeat process occurs at an upper layer, resulting in a significant delay. Thus, even after the assignment of the uplink reference signal resource is changed to the second radio terminal, it is considered to assign the downlink radio resource corresponding to the uplink reference signal resource temporarily to the first radio terminal and transmit the repeat data by using the downlink radio resource.

However, when such a method is employed, the symmetry between the uplink reference signal resource and the downlink radio resource is collapsed, resulting in a problem that the adaptive array control cannot be a favorably functioned.

Therefore, an object of the present invention is to provide a radio base station and a communication control method, with which it is possible to enable adaptive array control to be favorably functioned restraining a delay even when it becomes necessary to perform repeat when an assignment of an uplink reference signal resource is changed, in a TDD radio communication system.

In order to solve the aforementioned problem, the present invention has following features.

The feature of a radio base station according to the present invention is summarized as follows. A radio base station that performs radio communication by using adaptive array control and an automatic repeat request, in a TDD radio communication system, comprises: a resource assignment unit that assigns an uplink reference signal resource for transmitting an uplink reference signal utilized in the adaptive array control and a downlink radio resource that overlaps, on a frequency axis, with the uplink reference signal resource, to a radio terminal, wherein the resource assignment unit assigns the uplink reference signal resource within a range of a first frequency band that can be used for transmitting the uplink reference signal, and when it is necessary to transmit downlink repeat data to the radio terminal when an assignment of the uplink reference signal resource is switched from the radio terminal to another radio terminal, the resource assignment unit assigns a downlink radio resource for a downlink repeat data in a second frequency band outside the range of the first frequency band.

According to such a feature, when it is necessary to transmit the downlink repeat data to the first radio terminal when the assignment of the uplink reference signal resource is switched from the radio terminal (first radio terminal) to another radio terminal (second radio terminal), the radio base station assigns a radio resource for the downlink repeat data in a second frequency band outside a range of a first frequency band that can be used for transmitting the uplink reference signal (i.e., a frequency band that is not used for transmitting the uplink reference signal).

This enables the first radio terminal to quickly receive the downlink repeat data in the second frequency band that is not used for transmitting the uplink reference signal, and thus, it is possible to avoid a situation where a significant delay occurs as a result of the generation of a repeat process at an upper layer.

Further, the second radio terminal is capable of using the downlink radio resource that overlaps, on a frequency axis, with the uplink reference signal resource and the symmetry between the uplink reference signal resource and the downlink radio resource can be ensured, and thus, it is possible to enable the adaptive array control to be favorably functioned on the second radio terminal.

Therefore, even when it becomes necessary to perform repeat when an assignment of an uplink reference signal resource is changed, in a TDD radio communication system, it is possible to enable adaptive array control to be favorably functioned while restraining a delay.

Another feature of the radio base station according to the present invention is summarized as follows. In the aforementioned feature, the resource assignment unit assigns the uplink reference signal resource to the another radio terminal instead of the radio terminal, and assigns the downlink radio resource to the another radio terminal instead of the radio terminal.

Another feature of the radio base station according to the present invention is summarized as follows. In the aforementioned feature, the radio base station further comprises: a weight calculation unit that calculates the antenna weight that should be applied to downlink data transmitted by using the downlink radio resource, on the basis of the uplink reference signal.

Another feature of the radio base station according to the present invention is summarized as follows. In the aforementioned feature, the resource assignment unit assigns the uplink reference signal resource to the another radio terminal instead of the radio terminal, when an assignment priority for the another radio terminal is higher than an assignment priority for the radio terminal.

The feature of a communication control method according to the present invention is summarized as follows. A communication control method in a radio base station that performs radio communication by using adaptive array control and an automatic repeat request, in a TDD radio communication system, comprises: a step of assigning, within a range of a first frequency band that can be used for transmitting an uplink reference signal utilized in the adaptive array control, an uplink reference signal resource for transmitting the uplink reference signal, to a radio terminal; a step of assigning the uplink reference signal resource to another radio terminal instead of the radio terminal; and a step of assigning, when it is necessary to transmit downlink repeat data to the radio terminal when an assignment of the uplink reference signal resource is switched from the radio terminal to the another radio terminal, a downlink radio resource for a downlink repeat data in a second frequency band outside the range of the first frequency band.

DESCRIPTION OF THE EMBODIMENT

With reference to the drawings, an embodiment of the present invention will be described. In the drawings of the following embodiment, the same or similar reference signs are applied to the same or similar portions.

(Configuration of Radio Communication System)

Figure 1:
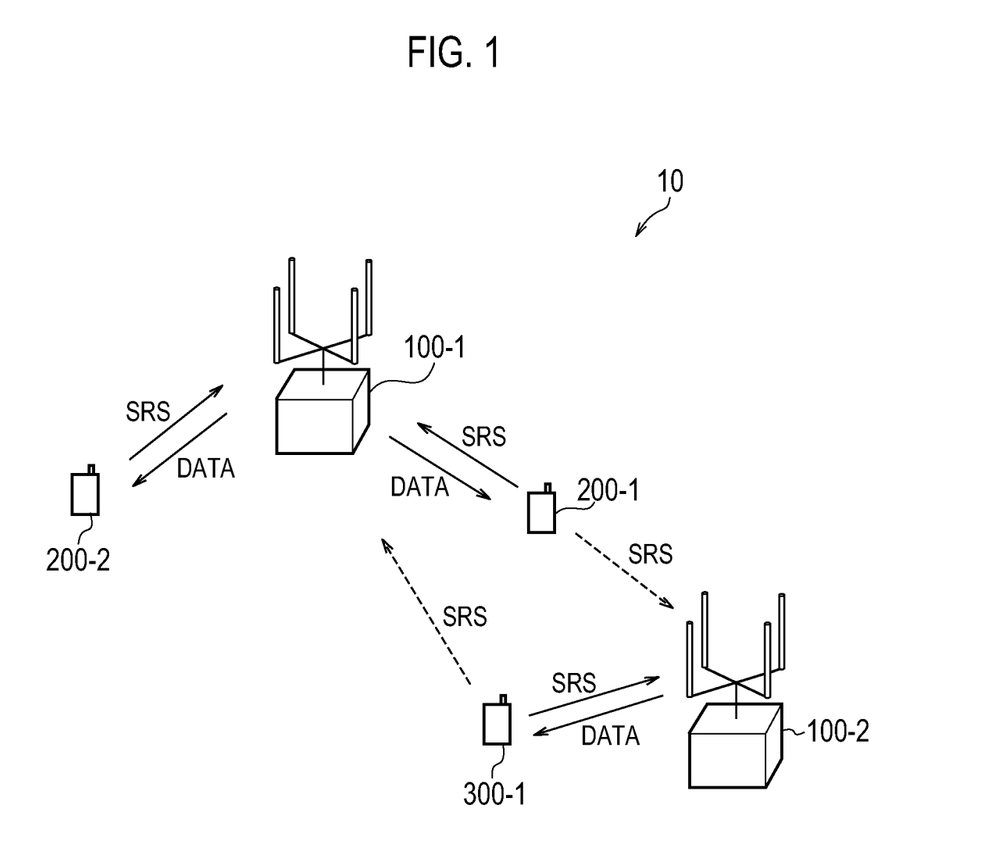
FIG. 1 is a configuration diagram of a TD-LTE system according to an embodiment of the present invention.

FIG. 1 is a configuration diagram of a TD-LTE system 10 according to the present embodiment. In the TD-LTE system 10, a TDD scheme is adopted as a duplex scheme. Further, in the TD-LTE system 10, OFDMA (Orthogonal Frequency Division Multiplexing Access) is adopted in Downlink (DL) radio communication and SC-FDMA (Single Carrier Frequency Division Multiple Access) is adopted in Uplink (UL) radio communication.

As shown in FIG. 1, the TD-LTE system 10 according to the present embodiment includes: a radio base station (eNB: evolved NodeB) 100-1; eNB 100-2 provided adjacently to the eNB 100-1; a radio terminal (UE: User Equipment) 200-1 subordinate to the eNB 100-1; UE 200-2 subordinate to the eNB 100-1; and UE 300-1 subordinate to the eNB 100-2.

It is noted that two UEs 200 subordinate to the eNB 100-1 are shown; however, in reality, more UEs 200 (UE 200-3, UE 200-4, . . . ) are subordinate to the eNB 100-1. Further, one UE 300-1 subordinate to the eNB 100-2 is shown; however, in reality, more UEs 300 (UE 300-2, UE 300-3, . . . ) are subordinate to the eNB 100-2.

Each UE 200 uses a cell formed by the eNB 100-1 as a serving cell, and a radio resource is assigned by the eNB 100-1. Each UE 300 uses a cell formed by the eNB 100-2 as a serving cell, and a radio resource is assigned by the eNB 100-2. It is noted that the radio resource is assigned so that a resource block (RB) including 12 successive subcarriers is one unit.

Each UE 200 and each UE 300 transmit a sounding reference signal (SRS) in a predetermined cycle. The SRS is a known signal sequence for measuring uplink channel quality. In transmitting the SRS, a frequency hopping scheme is applied. That is, a transmission frequency band of the SRS is switched for each transmission cycle of the SRS. In the present embodiment, the SRS corresponds to an uplink reference signal.

In the TD-LTE system 10, adaptive array control using an array antenna is introduced to each eNB 100.

The eNB 100-1 calculates an antenna weight on the basis of the SRS received from each UE 200 subordinate to the eNB 100-1 thereby to perform beamforming in which the peak of the directivity pattern of the array antenna is oriented to each UE 200. Further, the eNB 100-1 calculates the antenna weight on the basis of the SRS received from each UE 300 subordinate to the eNB 100-2 thereby to perform the null steering in which the null of the directivity pattern of the array antenna is oriented to each UE 300.

Similarly, the eNB 100-2 calculates the antenna weight on the basis of the SRS received from each UE 300 subordinate to the eNB 100-2, thereby performing the beamforming in which the peak of the directivity pattern of the array antenna is oriented to each UE 300. Further, the eNB 100-2 calculates the antenna weight on the basis of the SRS received from each UE 200 subordinate to the eNB 100-1, thereby performing the null steering in which the null of the directivity pattern of the array antenna is oriented to each UE 200.

Further, HARQ of an IR (Incremental Redundancy) scheme is introduced to the radio communication. The HARQ is obtained by combining automatic repeat request (ARQ) and forward error correction (FEC). Upon receiving, from a reception side, NACK (Negative ACKnowledgement) in response to initial transmission data, a transmission side transmits repeat data corresponding to the initial transmission data. In the IR scheme, redundancy data about the initial transmission data is used as the repeat data. By synthesizing the initial transmission data that had a failed decoding and the newly received repeat data, the reception side is capable of increasing a probability of a successful decoding.

(Configuration of Radio Base Station)

Figure 2:
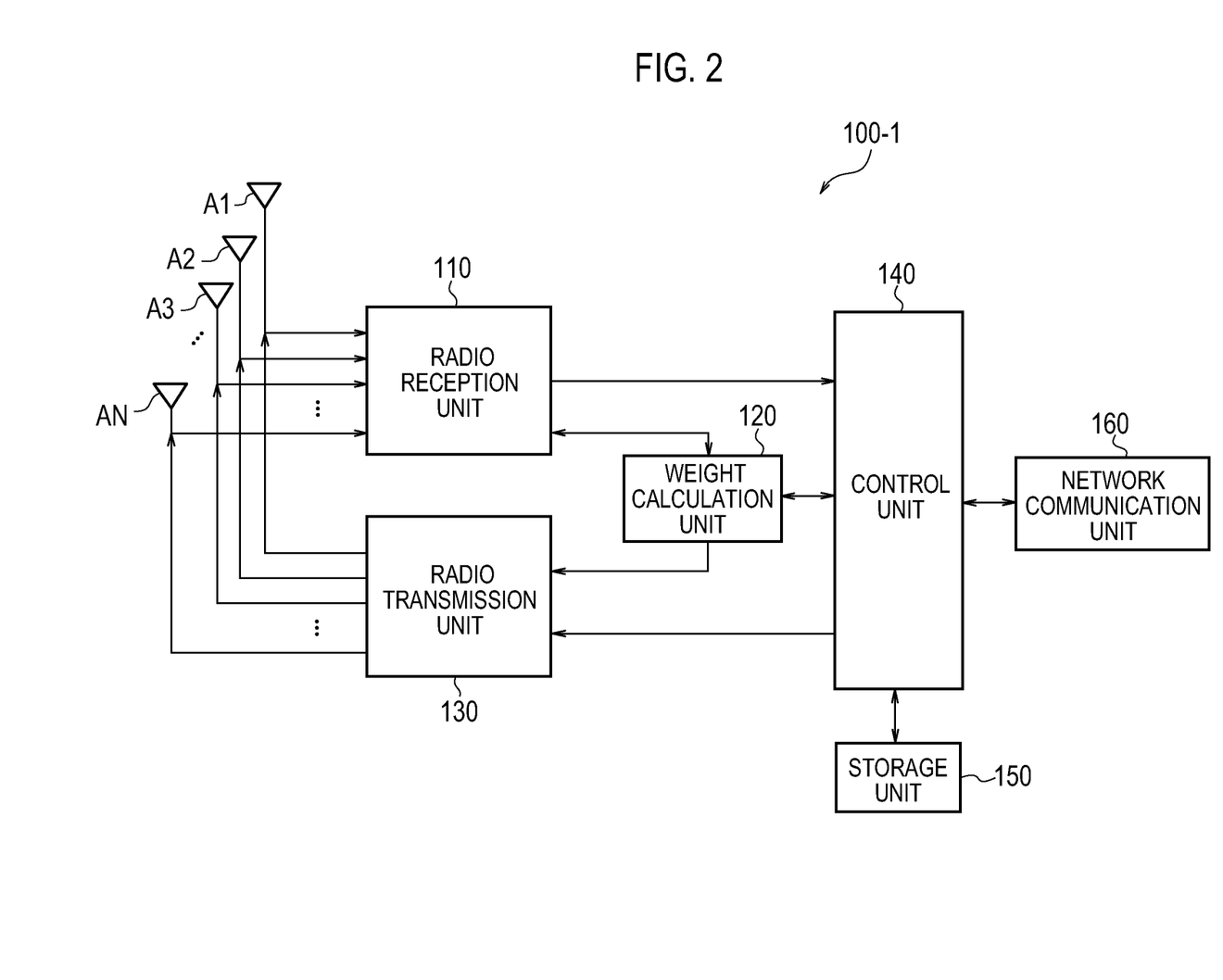
FIG. 2 is a block diagram of the eNB according to an embodiment of the present invention.

FIG. 2 is a block diagram of the eNB 100-1 according to the present embodiment. The eNB 100-2 is configured similarly to the eNB 100-1, and thus, the configuration of the eNB 100-1 is described as a representative of each eNB 100.

As shown in FIG. 2, the eNB 100-1 includes a plurality of antenna elements A1 to AN, a radio reception unit 110, a weight calculation unit 120, a radio transmission unit 130, a control unit 140, a storage unit 150, and a network communication unit 160.

The plurality of antenna elements A1 to AN configure an array antenna, and are used for transmitting and receiving a radio signal.

The radio reception unit 110 receives a reception signal including uplink data and the SRS, for each of the plurality of antenna elements A1 to AN. The radio reception unit 110 outputs the SRS included in the reception signal to the weight calculation unit 120, and receives the antenna weight calculated by the weight calculation unit 120. The radio reception unit 110 performs a weighting process in which the reception signal for each of the plurality of antenna elements A1 to AN is multiplied by the antenna weight and then synthesized, and outputs the weighted reception signal to the control unit 140. Further, the radio reception unit 110 amplifies the reception signal, converts (down-converts) the reception signal from a radio frequency (RF) band to a baseband (BB) band, and performs a demodulation process corresponding to an SC-FDMA scheme, for example.

The weight calculation unit 120 receives the SRS from the radio reception unit 110. The weight calculation unit 120 calculates the antenna weight for orienting the peak toward the UE 200 subordinate to the eNB 100-1 and orienting the null toward UE subordinate to another eNB, on the basis of the SRS from the UE 200 subordinate to the eNB 100-1 and the SRS from the UE subordinate to the other eNB. The weight calculation unit 120 outputs the calculated antenna weight to the radio reception unit 110 and the radio transmission unit 130.

The radio transmission unit 130 receives the transmission signal including the downlink data from the control unit 140 and receives the antenna weight from the weight calculation unit 120. The radio transmission unit 130 distributes the transmission signal to each of the plurality of antenna elements A1 to AN and performs a weighting process in which each transmission signal is multiplied by the antenna weight. The radio transmission unit 130 outputs the weighted transmission signal to the plurality of antenna elements A1 to AN. Further, the radio transmission unit 130 amplifies the transmission signal, converts (up-converts) the transmission signal from the BB band to the RF band, and performs a modulation process corresponding to the OFDMA scheme, for example.

The control unit 140 controls various functions of the eNB 100-1. The control unit 140 assigns the radio resource to each UE 200 subordinate to the eNB 100-1. That is, in the present embodiment, the control unit 140 corresponds to a resource assignment unit. In particular, the control unit 140 assigns an uplink SRS resource for transmitting SRS; a PUCCH (Physical Uplink Control Channel) resource for transmitting uplink control data; a PUSCH (Physical Uplink Shared Channel) resource for transmitting uplink user data; a PDCCH (Physical Downlink Control Channel) resource for transmitting downlink control data; and a PDSCH (Physical Downlink Shared Channel) resource for transmitting downlink user data, to each UE 200. The uplink SRS resource, the PUCCH resource, the PUSCH resource, the PDCCH resource, and the PDSCH resource are configured by one or a plurality of RBs, respectively.

The control unit 140 assigns the PUCCH resource, the PUSCH resource, the PDCCH resource, and the PDSCH resource, for each subframe, and controls so that the assignment information is notified to the UE 200 for each subframe. On the other hand, a specification does not allow an assignment of the uplink SRS resource to be changed for each subframe. Thus, the control unit 140 notifies the UE 200 of an assignment parameter by signaling of an upper layer, only when it becomes necessary to set or change the assignment. The assignment parameter of the uplink SRS resource includes an SRS bandwidth, an SRS transmission cycle, a hopping start frequency band, an SRS transmission available frequency band, etc. The SRS transmission available frequency band will be described later.

In the present embodiment, as a scheduling algorithm for defining a priority of an uplink SRS resource assignment, a PF (Proportional Fairness) scheme is used. In the PF scheme, a ratio of an instantaneous throughput to an average throughput is calculated for each UE 200, and the priority of the assignment is set higher as the ratio of the instantaneous throughput to the average throughput is higher.

Further, the control unit 140 assigns the PDSCH resource that overlaps, on a frequency axis, with the uplink SRS resource, for each UE 200. Herein, "overlaps" includes not only a case where the frequency band of the uplink SRS resource and the frequency band of the PDSCH resource are identical but also a case where at least one part of the frequency band of the uplink SRS resource and at least one part of the frequency band of the PDSCH resource are overlapped. It is noted that in the present embodiment, the description is given of the case where the frequency band of the uplink SRS resource and the frequency band of the PDSCH resource are identical.

Further, the control unit 140 performs control relating to the HARQ. The control unit 140 stores the repeat data corresponding to the initial transmission data in the storage unit 150 until the ACK for the initial transmission data is received from the UE 200. Then, the control unit 140 controls so that the repeat data is transmitted to the UE 200 when the NACK is received from the UE 200.

The storage unit 150 stores various types of information to be used for the control by the control unit 140. In the present embodiment, the storage unit 150 stores the repeat data that is waiting for the ACK from the UE 200.

The network communication unit 160 communicates with a core network (EPC: Evolved Packet Core) or with a neighboring eNB.

(Resource Assignment Operation)

Next, by using FIG. 3 to FIG. 7, a resource assignment operation according to the present embodiment will be described. Hereinafter, an operation in which the eNB 100-1 assigns a resource to each UE 200 subordinate to the eNB 100-1 will be described. It is noted that the eNB 100-2 also assigns the resource to each of the subordinate UEs 300 in much the same assignment rule as that applied to the eNB 100-1.

(1) Configuration of Radio Frame

Figure 3:
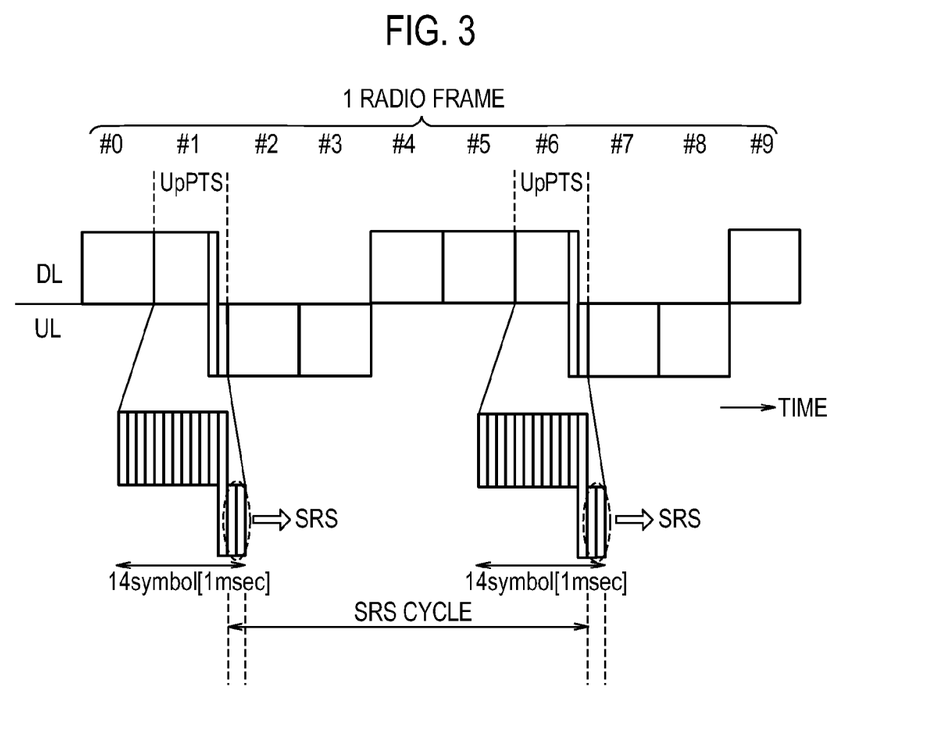
FIG. 3 is a configuration diagram of the radio frame used in the TD-LTE system according to an embodiment of the present invention.

Firstly, by using FIG. 3, the configuration of a radio frame used in the TD-LTE system 10 will be described. FIG. 3 is a configuration diagram of the radio frame used in the TD-LTE system 10 according to the present embodiment. It is noted that in a specification, there are seven patterns defined for the configuration of a radio frame of a TDD scheme (that is, a configuration pattern of a subframe); one of these patterns will be described, as an example, in the present embodiment.

As shown in FIG. 3, one radio frame is configured by 10 subframes on a time axis. Each subframe is configured by 14 symbols on a time axis. Each subframe has a time length of 1 msec. Further, each subframe is configured by about 100 RBs on a frequency axis.

A subframe #0, a subframe #4, a subframe #5, and a subframe #9 are downlink-dedicated subframes, respectively. In the downlink-dedicated subframe, a head portion is a control region used, on a time axis, as the PDCCH resource, and the remaining portion is a data region used as the PDSCH resource.

A subframe #2, a subframe #3, a subframe #7, and a subframe #8 are uplink-dedicated subframes, respectively. In the uplink-dedicated subframe, both ends are a control region used, on a frequency axis, as the PUCCH resource, and the remaining portion (central portion) is a data region used as the PUSCH resource.

A subframe #1 and a subframe #6 are special subframes for switching an uplink and a downlink, respectively. Each of the special subframes includes a downlink pilot time slot (DwPTS), a guard period (GP), and an uplink pilot time slot (UpPTS). It is noted that in a specification, there are a plurality of patterns defined for the configuration of the special subframe (that is, a symbol number of the DwPTS, the GP, and the UpPTS in the special subframe); one of these patterns will be described, as an example, in the present embodiment. In the present embodiment, the DwPTS occupies a first symbol to an 11th symbol, the GP occupies a 12th symbol, and the UpPTS occupies 13th and 14th symbols. Further, in the present embodiment, the UpPTS is used for transmitting the SRS. The eNB 100-1 assigns each uplink SRS resource included in the UpPTS, to each of the subordinate UEs 200.

(2) SRS Resource Assignment Operation

Figure 4:
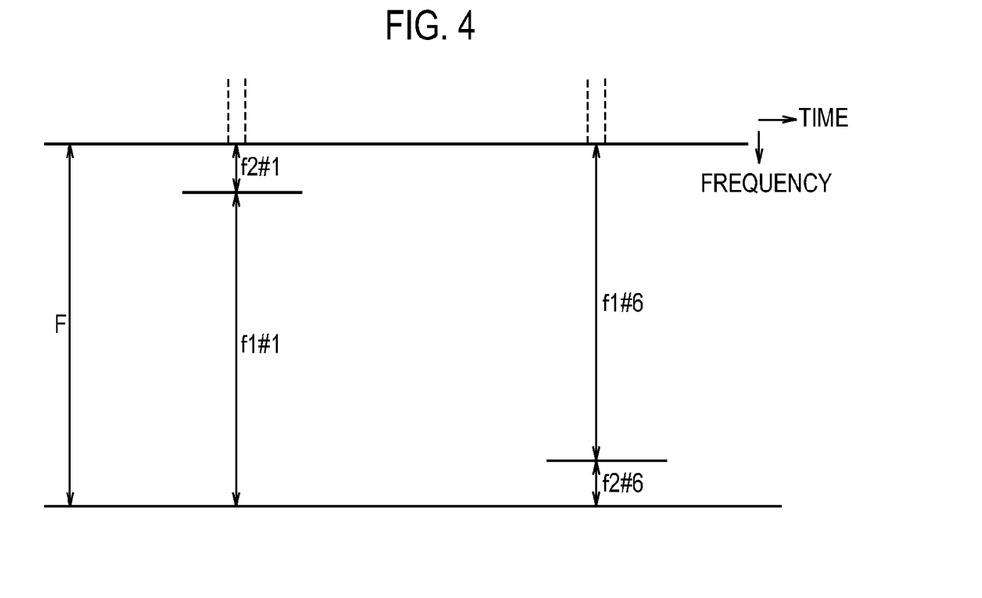
FIG. 4 is a diagram for describing an SRS transmission available frequency band set in the special subframe by the eNB according to an embodiment of the present invention.

FIG. 4 is a diagram for describing an SRS transmission available frequency band set in the special subframe, by the eNB 100-1.

As shown in FIG. 4, in the UpPTS of the special subframe #1, the eNB 100-1 sets most of a system frequency band (carrier frequency band) F that can be used for radio communication as an SRS transmission available frequency band f1#1. On the other hand, the eNB 100-1 sets the remaining portion (low frequency portion) of the system frequency band F as an SRS transmission unavailable frequency band f2#1.

In the UpPTS of the special subframe #6, the eNB 100-1 sets most of the system frequency band F as the SRS transmission available frequency band f1#6, and sets the remaining portion (high frequency portion) of the system frequency band F as the SRS transmission unavailable frequency band f2#6.

Figure 5:
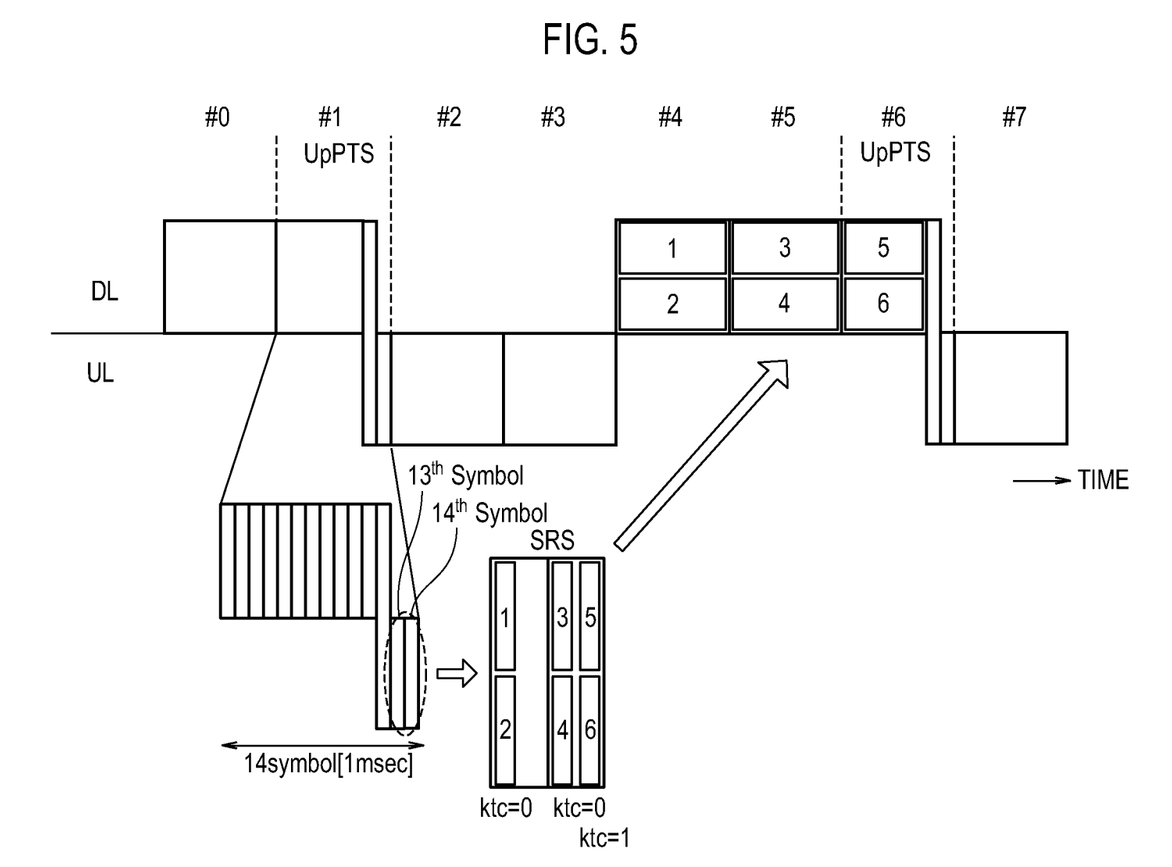
FIG. 5 is a diagram for describing an SRS resource assignment operation and a PDSCH resource assignment operation by the eNB according to an embodiment of the present invention.

FIG. 5 is a diagram for describing an SRS resource assignment operation and a PDSCH resource assignment operation by the eNB 100-1. In the following figures, an upper side of each subframe is a low frequency side, and a lower side of each subframe is a high frequency side. Further, the uplink SRS resource can be used in a comb-like fashion by dividing into an even-numbered subcarrier and an odd-numbered subcarrier, and frequency multiplexing is possible in an identical frequency band. Thus, the even-numbered subcarrier is written as ktc=0, and the odd-numbered subcarrier is written as ktc=1. It is noted that, in FIG. 5, the illustration of the SRS transmission unavailable frequency band is omitted.

As shown in FIG. 5, in a 13th symbol of the special subframe #1, the eNB 100-1 assigns ktc=0 of a low frequency band to the UE 200-1, and assigns ktc=0 of a high frequency band to the UE 200-2, respectively. Further, ktc=1 is not assigned to the UE 200.

Moreover, in a 14th symbol of the special subframe #1, the eNB 100-1 assigns ktc=0 of a low frequency band to the UE 200-3, assigns ktc=0 of a high frequency band to the UE 200-4, assigns ktc=1 of a low frequency band to the UE 200-5, and assigns ktc=1 of a high frequency band to the UE 200-6, respectively.

Such an assignment results in a situation where the eight uplink SRS resources are arranged in one UpPTS and eight SRSs are multiplexed (eight UEs are multiplexed). However, when the high frequency band and/or the low frequency band are further divided into narrower frequency bands to be used, more SRSs can be multiplexed.

(3) PDSCH Resource Assignment Operation

As described above, the eNB 100-1 assigns the PDSCH resource of the same frequency band as the assigned uplink SRS resource, for each UE 200. In other words, the PDSCH resource of the same frequency band as the received SRS is assigned for each UE 200.

As shown in FIG. 5, the eNB 100-1 receives the SRS of a low frequency band from the UE 200-1 in the special subframe #1, assigns the low frequency band in the downlink-dedicated subframe #4, as the PDSCH resource, to the UE 200-1, and transmits the assignment information to the UE 200-1 in a PDCCH region (not shown) in the downlink-dedicated subframe #4. Then, the eNB 100-1 uses the assigned PDSCH resource in the downlink-dedicated subframe #4 to transmit downlink user data destined to the UE 200-1.

Further, the eNB 100-1 receives the SRS of a high frequency band from the UE 200-2 in the special subframe #1, assigns the high frequency band in the downlink-dedicated subframe #4, as the PDSCH resource, to the UE 200-2, and transmits the assignment information to the UE 200-2 in a PDCCH region (not shown) in the downlink-dedicated subframe #4. Then, the eNB 100-1 uses the assigned PDSCH resource in the downlink-dedicated subframe #4 to transmit downlink user data destined to the UE 200-2.

Further, the eNB 100-1 performs the PDSCH resource assignment to the UE 200-3 to the UE 200-6 in much the same way. Thus, when the frequency band of the SRS and the frequency band of the PDSCH are made identical, that is, when the frequency band for calculating the antenna weight and the frequency band to which the antenna weight is applied are made identical, it becomes possible to enable the adaptive array control to be favorably functioned.

(4) SRS Resource Assignment Change Operation

Figure 6:
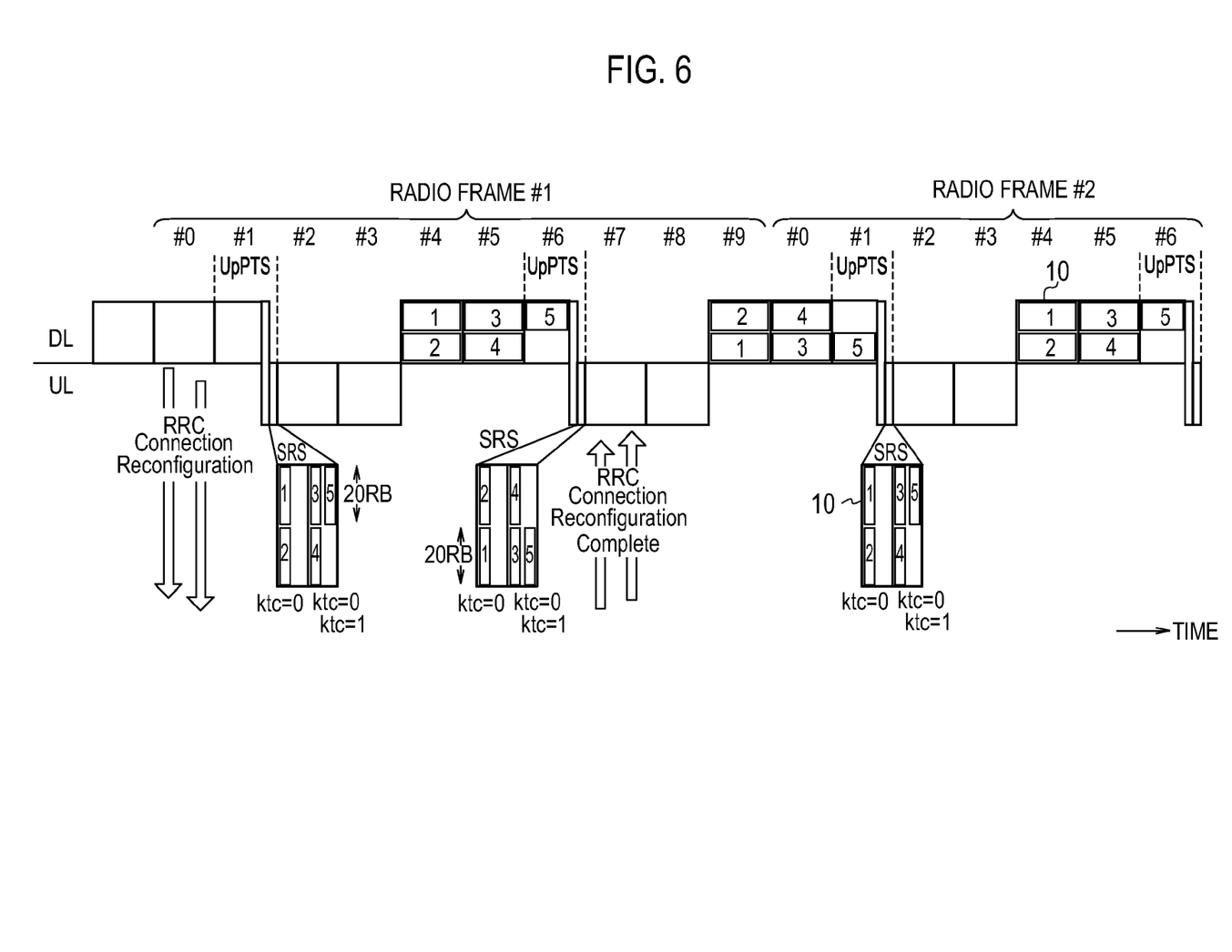
FIG. 6 is a diagram for describing an SRS resource assignment change operation according to an embodiment of the present invention.

FIG. 6 is a diagram for describing an SRS resource assignment change operation. In this case, an operation will be described in which the uplink SRS resource having been assigned to the UE 200-1 is assigned to the UE 200-10 instead of the UE 200-1.

As shown in FIG. 6, in a downlink-dedicated subframe #0 of a radio frame #1, the eNB 100-1 transmits, to the UE 200-1, RRC Connection Reconfiguration for instructing a transmission stop of the SRS, and transmits, to the UE 200-10, RRC Connection Reconfiguration for instructing a transmission start of the SRS. The RRC Connection Reconfiguration for instructing a transmission start of the SRS includes assignment information for designating the uplink SRS resource assigned to the UE 200-10. The assignment information includes an SRS bandwidth, an SRS transmission cycle, a hopping start frequency band, an SRS transmission available frequency band, and ktc (even-numbered subcarrier/odd-numbered subcarrier). It is noted that the RRC Connection Reconfiguration is an upper-layered message, and thus, it requires a certain time until reflected in the UE.

In the 13th symbol of the special subframe #1 of the radio frame #1, ktc=0 of a low frequency band is assigned to the UE 200-1, and ktc=0 of a high frequency band is assigned to the UE 200-2, respectively. In the 14th symbol of the special subframe #1, ktc=0 of a low frequency band is assigned to the UE 200-3, ktc=0 of a high frequency band is assigned to the UE 200-4, and ktc=1 of a low frequency band is assigned to the UE 200-5, respectively.

In the subframes #4, #5, and #6 of the radio frame #1, the eNB 100-1 assigns the PDSCH resource of the same frequency band as the received SRS, for each UE 200, in accordance with the above-described assignment rule.

In the UpPTS of the special subframe #6 of the radio frame #1. the frequency hopping is performed on the UpPTS of the special subframe #1. That is, in the UpPTS of the special subframe #1, the low frequency band and the high frequency band are switched.

In the uplink-dedicated subframe #7 of the radio frame #1, the eNB 100-1 receives RRC Connection Reconfiguration Complete, which is a completion report for the RRC Connection Reconfiguration, from the UE 200-1 and the UE 200-10, respectively. As a result, the eNB 100-1 recognizes that the assignment change of the uplink SRS resource is normally performed.

To the downlink-dedicated subframe #9 of the radio frame #1, the downlink-dedicated subframe #0 of the radio frame #2, and the downlink-dedicated subframe #1 of the radio frame #2, the eNB 100-1 assigns the PDSCH resource of the same frequency band as the received SRS, for each UE 200, in accordance with the above-described assignment rule.

In the UpPTS of the special subframe #1 of the radio frame #2, the uplink SRS resource to be assigned is switched from the UE 200-1 to the UE 200-10. In detail, in the 13th symbol of the special subframe #1 of the radio frame #2, ktc=0 of a low frequency band is assigned to the UE 200-10, instead of the UE 200-1.

In the subframes #4, #5, and #6 of the radio frame #2, the eNB 100-1 assigns the PDSCH resource of the same frequency band as the received SRS, for each UE 200, in accordance with the above-described assignment rule.

(5) Repeat Operation During SRS Resource Assignment Change

Figure 7:
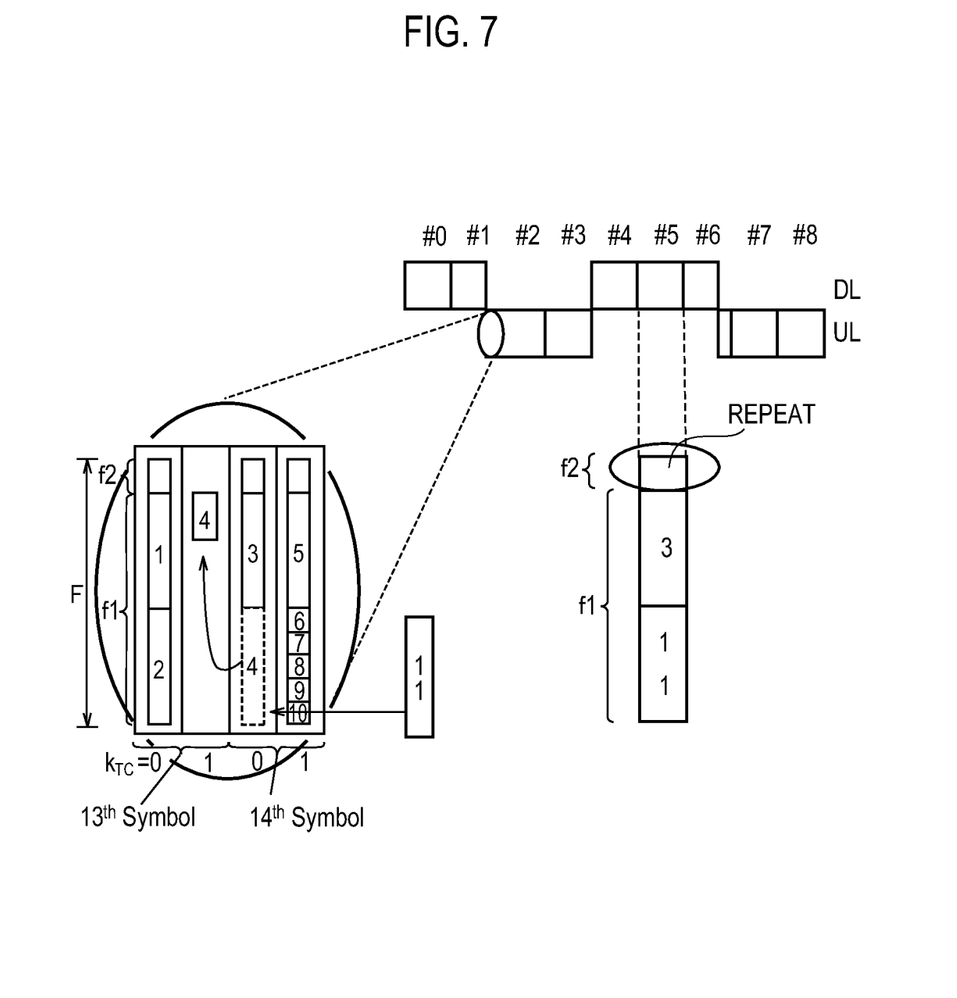
FIG. 7 is a diagram for describing a repeat operation during the SRS resource assignment change according to an embodiment of the present invention.

FIG. 7 is a diagram for describing a repeat operation during the SRS resource assignment change. In this case, an operation will be described in which when the assignment of the uplink SRS resource is switched from the UE 200-4 to UE 200-11, it becomes necessary to perform the HARQ repeat for the UE 200-4. FIG. 7 illustrates an SRS transmission available frequency band f1 and an SRS transmission unavailable frequency band f2.

As shown in FIG. 7, in the UpPTS of the special subframe #1, the assignment of the uplink SRS resource has been switched from the UE 200-4 to the UE 200-11. In particular, in the 14th symbol of the special subframe #1, the assignment of the uplink SRS resource of ktc=0 of a high frequency band is switched from the UE 200-4 to the UE 200-11. The UE 200-11 transmits the SRS by using the uplink SRS resource. In response thereto, the UE 200-4 stops the transmission of the SRS.

In this case, the eNB 100-1 detects that the downlink repeat data requested to be repeated by the UE 200-4 is left untransmitted, and determines that the HARQ repeat for the UE 200-4 is necessary.

In the subframes #4, #5, and #6, the eNB 100-1 assigns the PDSCH resource of the same frequency band as the received SRS, for each UE 200, in accordance with the above-described assignment rule. Thus, in the subframe #5, the eNB 100-1 receives the SRS of a high frequency band from the UE 200-11 in the special subframe #1, and assigns the high frequency band in the subframe #5, as the PDSCH resource, to the UE 200-11. Then, after the assignment information is transmitted to the UE 200-11 in a PDCCH region (not shown) in the subframe #5, the assigned PDSCH resource is used to transmit the downlink user data to the UE 200-11.

The subframe #5 is a subframe where the PDSCH resource should be assigned to the UE 200-4 unless there is the assignment change of the uplink SRS resource. Thus, in the subframe #5, the eNB 100-1 assigns the PDSCH resource of the UE 200-4 to a region corresponding to the SRS transmission unavailable frequency band f2 in the subframe #5. Then, after the assignment information is transmitted to the UE 200-4 by a PDCCH region (not shown) in the downlink-dedicated subframe #5, the assigned PDSCH resource is used to transmit the downlink repeat data to the UE 200-4.

In this case, in the PDSCH resource of the UE 200-4, the corresponding uplink SRS resource does not exist in the special subframe #1, and the eNB 100-1 does not receive the SRS sent from the UE 200-4, in the special subframe #1. Therefore, the eNB 100-1 may apply the antenna weight calculated on the basis of the SRS received from the UE 200-4 in the past before the special subframe #1, to the PDSCH resource of the UE 200-4.

As described above, the eNB 100-1 that performs radio communication by using the adaptive array control and the HARQ includes: the control unit 140 that assigns the uplink SRS resource for transmitting the SRS used for the adaptive array control and the PDSCH resource that overlaps, on the frequency axis, with the uplink SRS resource, to the UE 200. The control unit 140 assigns the uplink SRS resource within a range of the SRS transmission available frequency band f1 that can be used for transmitting the SRS. Further, when it is necessary to transmit the downlink repeat data to the UE 200-4 when the assignment of the uplink SRS resource is switched from the UE 200-4 to the UE 200-11, the control unit 140 assigns the PDSCH resource for the downlink repeat data in the SRS transmission unavailable frequency band f2 outside the range of the SRS transmission available frequency band f1.

This enables the UE 200-4 to quickly receive the downlink repeat data by the PDSCH resource corresponding to an SRS transmission prohibition frequency band f2, and thus, it is possible to avoid a situation where a significant delay occurs resulting from the generation of the repeat process at an upper layer. Further, it is also possible to shorten a time period in which data relating to the repeat should be stored, and thus, it is possible to save a storage capacity.

Moreover, the UE 200-11 is capable of using the PDSCH resource that overlaps, on the frequency axis, with the uplink SRS resource and it is possible to maintain the symmetry between the uplink SRS resource and the PDSCH resource, and thus, it is possible to enable the adaptive array control on the UE 200-11 to be favorably functioned. Specifically, the eNB 100-2 adjacent to the eNB 100-1 is capable of performing null steering on the UE 200-11 on the basis of the SRS received from the UE 200-11.

Therefore, even when it becomes necessary to perform the repeat when the assignment of the uplink SRS resource is changed, in the TD-LTE system 10, it is possible to enable adaptive array control to be favorably functioned while restraining a delay.

Other Embodiment

As described above, the present invention has been described according to the embodiment. It must not be understood that, however, the discussions and the drawings constituting a part of this disclosure limit the present invention. From this disclosure, various alternative embodiments, examples and operational techniques are apparent to those skilled in the art.

In the above-described embodiment, the description is given of the example where the SRS is used as the uplink reference signal utilized in the adaptive array control; however, a demodulation reference signal (DMRS) may be used instead of the SRS.

Further, in the above-described embodiment, the description is given of the example where the present invention is applied to the TD-LTE system 10; however, the present invention may be applied to another system adopting the TDD scheme and the adaptive array control. In this case, the HARQ of another scheme may be used instead of the HARQ of the IR scheme.

Note that the entire content of the Japanese Patent Application No. 2011-163734 (filed on Jul. 26, 2011) is incorporated herein by reference.

INDUSTRIAL APPLICABILITY

As mentioned above, the present invention is useful in radio communication such as mobile communication, with which it is possible to enable adaptive array control to be favorably functioned restraining a delay even when it becomes necessary to perform repeat when an assignment of an uplink reference signal resource is changed, in a TDD radio communication system.

The invention claimed is:

1. A radio base station that performs radio communication by using adaptive array control and an automatic repeat request, in a TDD radio communication system, comprising:
    a resource assignment unit that assigns an uplink reference signal resource for transmitting an uplink reference signal utilized in the adaptive array control and a downlink radio resource that overlaps, on a frequency axis, with the uplink reference signal resource, to a radio terminal, wherein
    the resource assignment unit assigns the uplink reference signal resource within a range of a first frequency band that can be used for transmitting the uplink reference signal, and
    when it is necessary to transmit downlink repeat data to the radio terminal when an assignment of the uplink reference signal resource is switched from the radio terminal to another radio terminal, the resource assignment unit assigns a downlink radio resource for a downlink repeat data in a second frequency band outside the range of the first frequency band, wherein
    the second frequency band is pre-designated for the assignment of the radio resource, specifically for the downlink repeat data, prior to switching the uplink reference signal resource from the radio terminal to the another radio terminal and prior to HARQ transmission, and
    the second frequency band is pre-designated as an uplink reference signal transmission unavailable frequency band prior to switching the uplink reference signal from the radio terminal to the another radio terminal and prior to HARQ transmission.

2. The radio base station according to claim 1, wherein
    the resource assignment unit assigns the uplink reference signal resource to the another radio terminal instead of the radio terminal, and assigns the downlink radio resource to the another radio terminal instead of the radio terminal.

3. The radio base station according to claim 1, further comprising:
    a weight calculation unit that calculates the antenna weight that should be applied to downlink data transmitted by using the downlink radio resource, on the basis of the uplink reference signal.

4. The radio base station according to claim 1, wherein
    the resource assignment unit assigns the uplink reference signal resource to the another radio terminal instead of the radio terminal, when an assignment priority for the another radio terminal is higher than an assignment priority for the radio terminal.

5. A communication control method in a radio base station that performs radio communication by using adaptive array control and an automatic repeat request, in a TDD radio communication system, comprising:
    a step of assigning, within a range of a first frequency band that can be used for transmitting an uplink reference signal utilized in the adaptive array control, an uplink reference signal resource for transmitting the uplink reference signal, to a radio terminal;
    a step of assigning the uplink reference signal resource to another radio terminal instead of the radio terminal; and
    a step of assigning, when it is necessary to transmit downlink repeat data to the radio terminal when an assignment of the uplink reference signal resource is switched from the radio terminal to the another radio terminal, a downlink radio resource for a downlink repeat data in a second frequency band outside the range of the first frequency band, wherein
    the second frequency band is pre-designated for the assignment of the radio resource, specifically for the downlink repeat data, prior to switching the uplink reference signal resource from the radio terminal to the another radio terminal and prior to HARQ transmission, and
    the second frequency band is pre-designated as an uplink reference signal transmission unavailable frequency band prior to switching the uplink reference signal from the radio terminal to the another radio terminal and prior to HARQ transmission.

* * * * *